United States Patent
Morgan et al.

(10) Patent No.: US 10,121,209 B2
(45) Date of Patent: Nov. 6, 2018

(54) AUTOMATED EMPLOYEE MANAGEMENT TECHNIQUES

(71) Applicant: NCR Corporation, Duluth, GA (US)

(72) Inventors: Taylor Drake Morgan, Atlanta, GA (US); Jeffrey Daniel Hughes, Irving, TX (US); Ethan Michael Edgerton, Atlanta, GA (US); David Allen Turner, Fort Worth, TX (US)

(73) Assignee: NCR Corporation, Atlanta, GA (US)

( * ) Notice: Subject to any disclaimer, the term of this patent is extended or adjusted under 35 U.S.C. 154(b) by 723 days.

(21) Appl. No.: 14/042,529

(22) Filed: Sep. 30, 2013

(65) Prior Publication Data
US 2015/0095171 A1     Apr. 2, 2015

(51) Int. Cl.
| G06Q 20/00 | (2012.01) |
| G06Q 40/00 | (2012.01) |
| G06Q 10/10 | (2012.01) |

(52) U.S. Cl.
CPC ......... G06Q 40/125 (2013.12); G06Q 10/105 (2013.01)

(58) Field of Classification Search
CPC ......... G06Q 10/10; G06Q 40/00; G06Q 10/06
USPC ................. 705/7.25, 14.35, 32, 16
See application file for complete search history.

(56) References Cited

U.S. PATENT DOCUMENTS

| 2003/0191700 | A1* | 10/2003 | Horne ............ G06Q 10/063114 705/32 |
| 2008/0296364 | A1* | 12/2008 | Pappas ................... G06Q 10/06 235/377 |
| 2009/0248552 | A1* | 10/2009 | Taylor .................... G06Q 10/10 705/32 |
| 2012/0161971 | A1* | 6/2012 | Nasir ....................... G07C 1/10 340/573.4 |
| 2012/0278211 | A1* | 11/2012 | Loveland ................. G07C 1/10 705/32 |
| 2013/0185137 | A1* | 7/2013 | Shafi ................... G06Q 30/0207 705/14.35 |
| 2014/0372161 | A1* | 12/2014 | Ulrich ............ G06Q 10/063118 705/7.17 |
| 2015/0109128 | A1* | 4/2015 | Fadell .................. G08B 27/003 340/540 |

* cited by examiner

Primary Examiner — Rokib Masud
(74) Attorney, Agent, or Firm — Schwegman, Lundberg & Woessner

(57) ABSTRACT

Techniques for automated employee management are provided. A clock action for an employee is acquired and analyzed based on rules. Next, a decision is made whether to automatically accept the clock action, automatically deny the clock action, or interactively request approval from a supervisor for the clock action. The decision is based on analysis of the rules.

8 Claims, 3 Drawing Sheets

AUTOMATED EMPLOYEE MANAGEMENT TECHNIQUES

BACKGROUND

Labor compliance laws in the U.S.A. vary from state to state and the penalties levied against employers for violations can range from mandatory overtime pay for employees to costly lawsuits. The complexity of the law and the difficulty in implementing, managing, and monitoring enforcement of such laws ultimately adds to the overall cost of operations.

Moreover, employers need a way to communicate in real-time with their employees, monitor employee clock-in/clock-out and break activity, and ensure compliance with labor laws in order to reduce overall labor costs.

Similarly, employees need to be alerted when a break is due because they may not always now or may not be paying attention because they are so busy doing their jobs.

When mistakes occur either on the employee or employer side with respect to employee breaks, checking in, and/or checking out, then it is the employer that can get in a lot of trouble with government authorities or labor organizations.

Rarely, is an enterprise intentionally doing something wrong, but in many instances intent is irrelevant with respect to the repercussions. Most likely, employers lack the proper automated monitoring techniques, communication, and/or procedures for catching mistakes before they can occur.

Therefore, improved techniques for automated employee management are needed.

SUMMARY

In various embodiments, automated employee management techniques are presented.

According to an embodiment, a method for automatically managing a clock action of an employee is provided. Specifically, in an embodiment, a clock action is acquired for an employee and analyzed in view of rules for the clock action. Finally, a decision is made as to whether to accept, to deny or to interactively request approval for the clock action in response to analyzing the rules.

DETAILED DESCRIPTION

Figure 1:
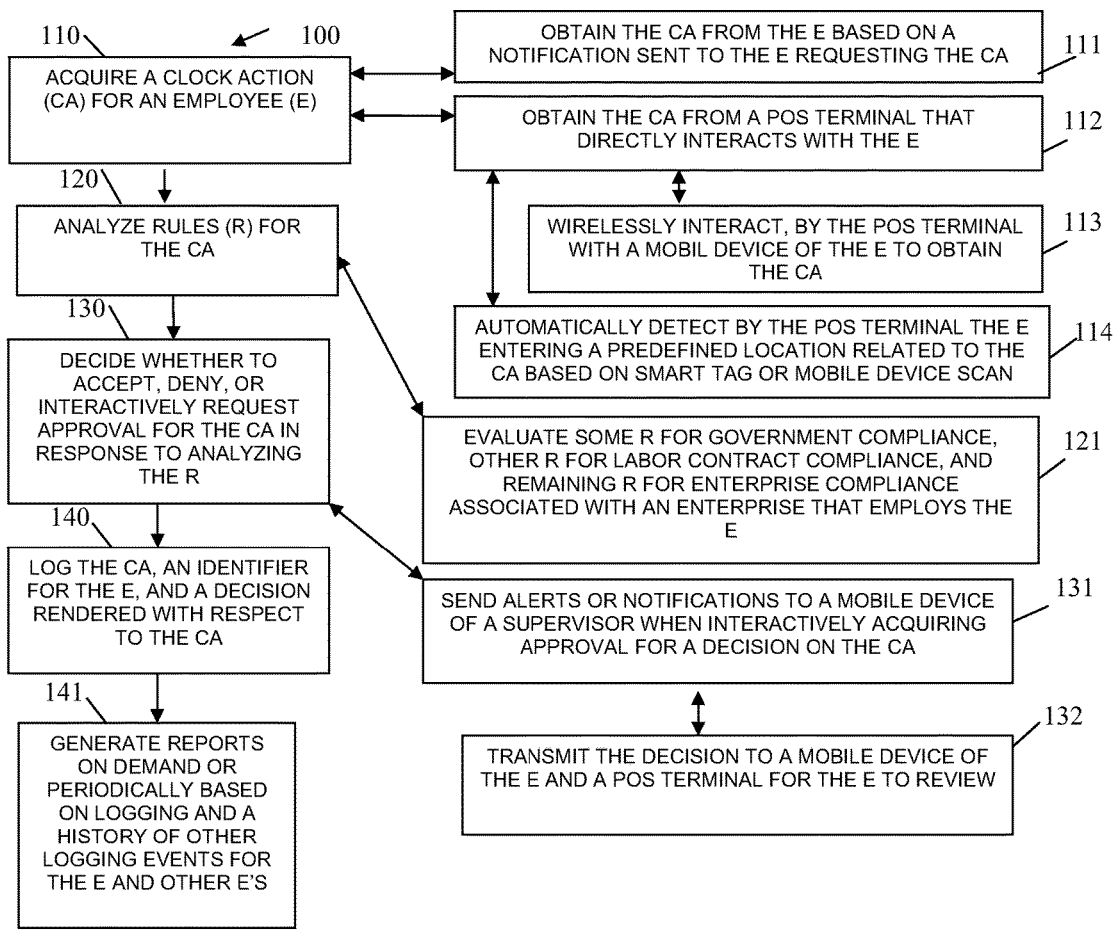
FIG. 1 is a diagram of a method for automatically managing a clock action of an employee, according to an example embodiment.

FIG. 1 is a diagram of a method 100 for automatically managing a clock action of an employee, according to an example embodiment. The method 100 (hereinafter "employee monitor") is implemented as instructions programmed and residing within memory and/or a non-transitory computer-readable (processor-readable) storage medium and executed by one or more processors of a device. The processors are specifically configured and programmed to process the employee monitor. The employee monitor operates over a network. The network is wired, wireless, or a combination of wired and wireless.

In an embodiment, the employee monitor is processed on a cloud server. In another case, the employee monitor is processed on a Point-Of-Sale (POS) terminal.

As used herein a "clock action" is an action that an enterprise needs to track with respect to an employee either because of government or labor compliance or because of internal employee procedures. In an embodiment, a "clock action" includes an employee action with respect to: starting a break, ending a break, checking in for work with an employer, and/or checking out of work for an employer.

At 110, the employee monitor acquires a clock action for an employee. The acquisition of the clock action is automated and can occur in a variety of manners either directly or indirectly from the employee.

For example, at 111, the employee monitor obtains the clock action from an employee based on a notification sent to the employee requesting that the employee take that specified clock action. Here, an employee may need to take a break and to ensure the employee is aware of that the employee monitor sends a notice or alert either to a POS terminal that the employee is operating or in front of, or to a mobile device of the employee, such as via a text message, or a message that is specific to a customized mobile app provided to the mobile device of the employee (an example of such a mobile app is provided below with the discussion of the FIGS. 2 and 3).

In another case, at 112, the employee monitor obtains the clock action from a POS terminal that directly interacts with the employee. So, the employee may directly (manually) interface with the POS terminal or indirectly (via a mobile app, smart tag, etc.) interface with the POS terminal to communicate the clock action.

Continuing with the case of 112 and at 113, the employee monitor wirelessly interacts with the POS terminal via a mobile device of the employee (as discussed above and at greater length below with respect to the FIGS. 2 and 3). The clock action is obtained during this wireless communication.

Still continuing with the case of 112 and at 114, the POS terminal automatically detects the employee entering a predefined location related to the clock action based on a smart tag or mobile device scan of the POS terminal. So, the POS terminal can be a scanner or sensor that the employee passes in front of and some tag possessed by the employee is read to initiate the clock action. The POS terminal can include a Bluetooth Low Energy fob placed at the terminal. When the employee comes within range of the micro-targeted Bluetooth Low Energy perimeter, then the employee is clocked in. Conversely, if the employee left a predefined perimeter, they the employee is automatically clocked-out. The predefined location can be a break room, an entry to the facility, or any designated area that employees enter or leave from.

At 120, the employee monitor analyzes rules for the clock action. These rules can be conditions and policies that the enterprise desires to monitor for governmental, labor organization, and enterprise compliance. A variety of examples that the rules can define are provided below after the discussion of the FIG. 1 for purposes of illustration and comprehension.

According to an embodiment, at 121, the employee monitor evaluates some of the rules for government compliance, other rules for labor contract compliance, and remaining rules for enterprise compliance, which is associated with the enterprise that employs the employee (these scenarios were discussed above as well).

At 130, the employee monitor decides whether to accept, deny, or interactively request approval for the clock action. This is done in response to analyzing the rules. In other words, the results from analyzing the rules may be to automatically accept the employee clock action, automatically deny the employee clock action, or automatically initiate an interactive approval process with a supervisor of the employee that is authorized by the enterprise to allow or deny the clock action. This occurs in near-real time, meaning within a few seconds from when the employee attempts the clock action.

In an embodiment, at 131, the employee monitor sends alerts or notifications to a mobile device of a supervisor when interactively acquiring approval for a decision on the clock action. So, the supervisor includes a mobile app to interactively approve or in some instances this can be a text message to the mobile device of the supervisor.

Continuing with the embodiment of 131 and at 132, the employee monitor transmits the decision to a mobile device of the employee and a POS terminal for the employee to review. So, once a decision is made, the employee gets notice via the employee's mobile device and/or via a display associated with the POS terminal.

According to an embodiment, at 140, the employee monitor logs the clock action, an identifier for the employee, and a decision rendered with respect to the clock action. This can be done for compliance and/or for reporting and planning purposes.

For example, at 141, the employee monitor generates reports on demand or periodically based on locking and a history of other logging events for the employee and other employees. So, clock actions of a single employee can be used in reports, clock actions of all or groups of employees can be used in reports, and/or clock actions of a single employee or group of employees relative to other employees or groups of employees can be used in reports. In fact, any customized report can be defined and produced based on a custom-defined event or time interval.

The employee monitor automates clock actions that heretofore have been almost entirely ad hoc and mostly manual within enterprise and by so doing creates a variety of new efficiencies and opportunities for managing employees. Consider some of these efficiencies in the examples below that illustrate the features of the employee monitor.

Mobile device to POS information transfer can occur in some embodiments of the employee monitor, where further interaction occurs with a cloud server. This allows a POS system, such as at a restaurant, to dynamically and in near-real time push information about employee clock-ins (type of clock action), clock-outs (type of clock action), and employee break information (type of clock action, and push messages between supervisors and employees to a cloud-based approach (employee monitor). The cloud server can retrieve this information and transmit results or rule evaluations back to the POS system and/or employee mobile device and even supervisor mobile devices. So, supervisors can monitor and dynamically approve clock actions via their mobile devices. Proactive notifications can be sent unsolicited by the employee monitor to the employees and managers as well based on continual rule evaluation to inform when breaks should occur, when breaks should end, when check-in is permitted, and/or when check-out is desired.

So, if an employee attempts to take a break outside the scope of a specific time frame (by attempting to clock-out), then a notification is sent via a pop-up message to the POS terminal at which the employee is logged into stating: "you are attempting to take a break outside of the time frame that has been specified by your manager, would you like to request approval from your manager or a supervisor? Please select the Yes or No option in this message." If yes is selected, a notification is sent to the supervisor (either to the mobile device of the supervisor and/or to a terminal device that the supervisor is presently logged onto). That notification may say: "employee N is attempting to take a break and is only authorized for a break at time Y, the present break is early by Z minutes, approve or deny select the option." The supervisory selection is then sent back to the POS terminal and/or employee mobile device. When the break is denied, the employee can get feedback such as "please take your break in Z minutes." This all occurs in near-real time.

In another case, an employee may be clocked in for X hours, where X is the hour threshold at which the employee is required to take a break minus 2 hours. Without supervisor interaction, the employee monitor can send a notice to the employee based on the rule evaluations (and the configured 2 hour threshold—note can be any amount of time) stating: "you need to take a break, take your break now select option yes or no." Selecting yes can initiate an informative notice to the supervisor of the employee (is such a rule is configured by the enterprise). Selecting no will initiate a take-action notice to the supervisor to investigate. The notices can be configured by the rules to keep occurring every Z minutes until the employee clocks-out or the supervisor overrides.

In still another situation, if an employee attempts to clock-in before his/her scheduled time, then a message can be displayed that states: "your check-in is too early by Z minutes, do you want to request supervisory approval, select yes or no." In each case, where approval is needed a message can be displayed stating: "pending manager approvals please wait on the decision." In some situations, the rules can be configured to deny the check-in if a supervisor fails to respond within a given time frame or the rules may allow if the employee has had fewer than X early check-ins in the past. The rules can state default situations to take. The supervisor then gets a message when yes is selected and can approve or deny in near-real time.

In one case, an employee may try to check-in too early from a break. The rules evaluated by the employee monitor may by default deny such a clock action and ask if supervisory approval is being requested. Then, based on the selection actions similar to what was discussed above are taken.

In another case, an employee may clock-in for too short of a period indicating that Reporting Time Pay may be required, such that the employee monitor based on evaluation of the rules may ask employee if Reporting Time Pay is required or requested. If yes is selected, then interactive approval is requested of the supervisor.

Similarly, by labor or governmental regulations, if an employee checks back-in after checking out in a same day, then evaluation as to whether Split Shift Pay can occur and notices and approvals or denials automatically obtained via the supervisor.

Notices can be sent when employees forget to check-out as well to both the employee and one or more supervisors.

Additionally, consider a shift manager that retrieves shift data (clock-in/clock-out information) and uses a unique algorithm that analyzes the days and times that employees normally clock-in/clock-out and generates a projected cloud-schedule. The schedule is referenced by the algorithm to determine when individual employees and employees of certain job codes are normally scheduled to work. The algorithm then verifies whether or not the employee's clock-in/clock-out times are valid based on the cloud-based calendar. There are prevention alerts and notifications for early clock-in, late clock-out, late employee, over shift length, and overtime violations that allow the operators to realize significant cost savings in labor. The shift manager user interface allows managers to: 1) communicate in real-time; 2) monitor and approve or decline employee clock-in/clock-out activity; 3) monitor and approve or decline employee break activity; 4) monitor and prevent early clock-ins, late clock-outs, over shift length, and overtime; 5) edit schedule information on the fly on a mobile device; and/or 6) view historical employee violations, shifts, and note information. All of this information is viewable at the store cost level and employee cost level in three timeframes: today, month to date, and last six months.

In fact, mobile device to POS information transfer through a cloud repository interface allows the POS system at a restaurant or other venue to push information about employee clock-ins, employee clock-outs, employee break activity and messages between operators and employees to a cloud server (the repository) in real time or near real time. The repository provides an interface to retrieve this information and transmit such information back to the POS system or to mobile devices carried by employees or managers at the venue.

With this ability to aggregate and analyze information at the cloud level, a shift manager is able to prevent early clock-ins and send other preventative, real-time alerts for impending violations, such as approaching out time and approaching overtime. All of this leads to significant reductions in total labor dollars spend as a percentage of sales profits, returning much needed revenue to the bottom fine for operators.

All these metrics for the various scenarios and actions of the employees and supervisors can be used for custom reporting and analysis. Moreover, projections can be made to develop more realistic work schedules for the employees being scheduled and to head off problems before they occur.

It is noted that these are some situations with specific rules and that other situations can occur as well and can be custom provided via the rules to the employee monitor.

Figure 2:
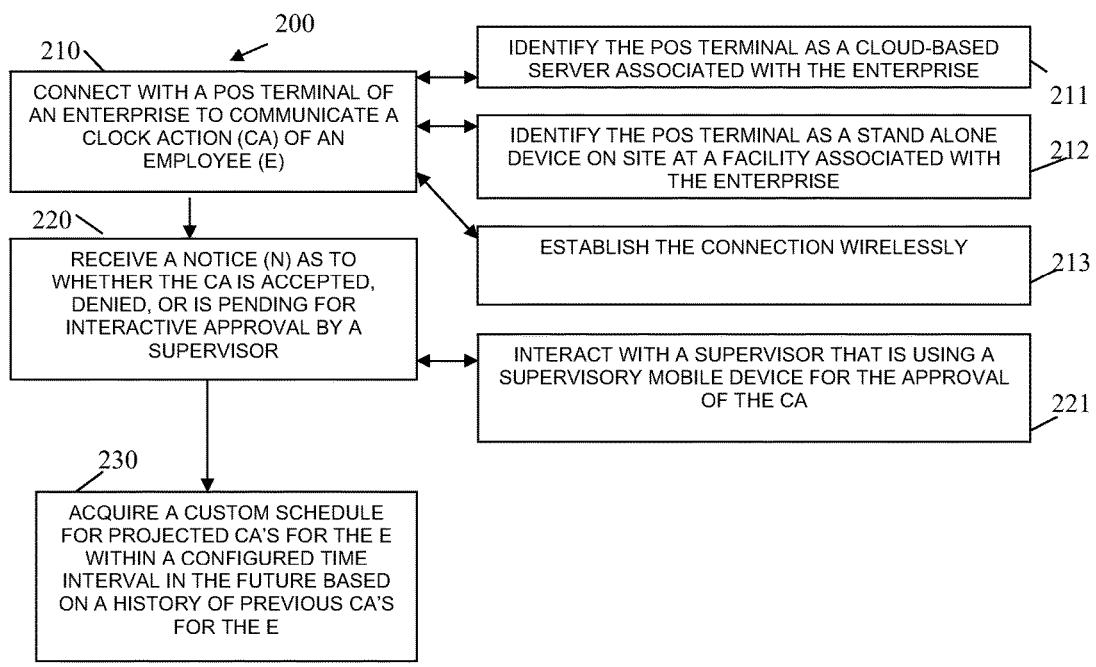
FIG. 2 is a diagram of another method for automatically managing a clock action of an employee, according to an example embodiment.

FIG. 2 is a diagram of another method 200 for automatically managing a clock action of an employee, according to an example embodiment. The method 200 (hereinafter "clock app") is implemented as instruction and programmed within memory and/or a non-transitory computer-readable (processor-readable) storage medium that executes on one or more processors of a mobile device; the processors of the mobile device are specifically configured to execute the clock app. The clock app is operational over a network; the network is wired, wireless, or a combination of wired and wireless.

Whereas the employee monitor (the FIG. 1 above) describes processing (for the most part) associated with a cloud server and/or POS terminal, the clock app describes processing occurring on a mobile device (phone, wearable device, tablet, laptop, etc.). The clock app interacts with the employee monitor, described in detail above with respect to the FIG. 1.

At 210, the clock app connects with a POS terminal of an enterprise to communicate a clock action of an employee. This was one scenario discussed above with respect to the FIG. 1 at 113.

According to an embodiment, at 211, clock app identifies the POS terminal as a cloud-based server associated with the enterprise.

In another case, at 212, the clock app identifies the POS terminal as a stand-alone device on site at a facility associated with the enterprise.

So, the POS terminal can be server-based or client-based.

In an embodiment, at 213, the clock app establishes the connection wirelessly with the POS terminal.

At 220, the clock app receives a notice as to whether the clock action is accepted, denied, or is pending for interactive approval by a supervisor. Various scenarios and messages (notices) associated with this aspect of the clock app were presented above with respect to the FIG. 1.

According to an embodiment, at 221, the clock app interacts with a supervisor that is using a supervisory mobile device for approval of the clock action. This is slightly different from what was discussed above with respect to the FIG. 1; here, the supervisor and the employee may directly interact via different instances of the clock app for approval or denial decisions.

In an embodiment, at 230, the clock app acquires a custom schedule for projected clock actions for the employee within a configured time interval in the future based on a history of previous clock actions for the employee. In this instance, the clock app may enforce security such that only a supervisor having the clock app can receive such a schedule. In fact, the clock app may permit the custom reporting actions discussed above with the FIG. 1.

Figure 3:
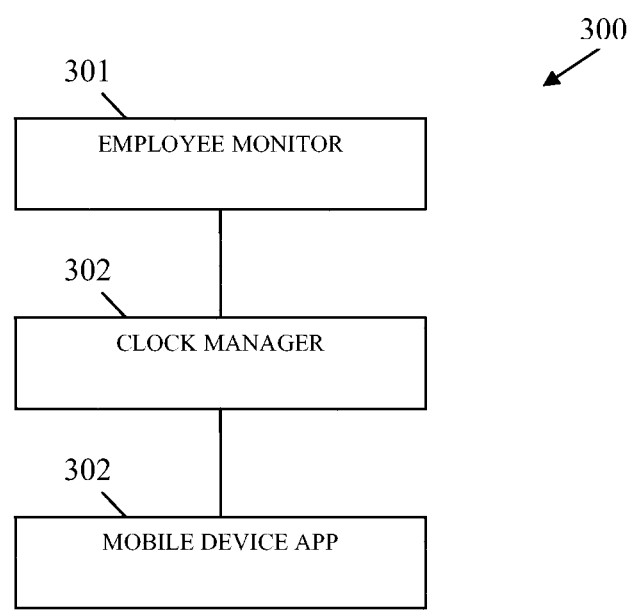
FIG. 3 is a diagram of an automatic employee management system, according to an example embodiment.

FIG. 3 is a diagram of an automatic employee management system 300, according to an example embodiment. The components of the automatic employee management system 300 are programmed and resided within memory and/or a non-transitory computer-readable medium and execute on one or more processors of one or more devices. The automatic employee management system 300 is operational over a network and the network can be wired, wireless, or a combination of wired and wireless.

The automatic employee management system 300 includes an employee monitor 301 and a clock manager 302. In an embodiment, the automatic employee management system 300 includes a mobile app 303. Each of these will be discussed in turn.

The automatic employee management system 300 includes a POS device having the employee monitor 301 programmed within memory and/or a non-transitory computer-readable storage medium for execution on one or more processors of the POS device. Example processing associated with the employee monitor 301 was presented above in detail with reference to the FIG. 1.

The automatic employee management system 300 includes a cloud server device having the clock manager 302 programmed within memory and/or a non-transitory computer-readable storage medium for execution on one or more processors of the POS device. Example processing associated with the clock manager 302 was presented above in detail with reference to the FIG. 1.

The clock manager 302 is configured to evaluate the clock actions in view of rules and to interactively engage supervisory approval or denial when dictated by evaluation of the rules. The clock manager 302 is further configured to communicate results for the clock actions back to the POS device for communication to the employee in near-real time.

The automatic employee management system 300 includes, in some embodiments, a mobile device app 303 configured to process on a supervisor's mobile device and an employee's mobile device as a mobile application. The mobile device app 303 is configured to interact with the employee monitor 301 on the POS device and the clock manager 302 on the cloud server.

Continuing with the prior embodiment and in some other instances, the mobile device app 303 is also configured to communicate a geographical location of the employee's mobile device to the employee monitor 301 to use or as one or more automated clock actions. So, assuming the employee consents and is not coerced in any manner, the employee's mobile device has the mobile device app 303 installed and processing on that mobile device and the geographical position can be used to initiate automated clock actions.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for processing a clock action, comprising:
    acquiring, by a server, the clock action for an employee by acquiring the clock action from a Point-Of-Sale (POS) terminal;
    wherein acquiring further includes automatically detecting, by the POS terminal, a low energy fob in possession of an employee entering a micro-targeted low energy perimeter area of the POS terminal and providing the clock action in response to the detecting to the server;
    analyzing, by the server, one or more rules associated with the clock action, and wherein analyzing further includes evaluating at least one rule for government compliance, at least one rule for labor contract compliance, and at least one rule for enterprise compliance associated with an enterprise; deciding, by the server and in near-real time from acquiring the clock action one of: whether to automatically accept, automatically deny, and automatically and interactively request approval for the clock action based at least in part on analyzing the rules;
    sending, by the server, one or more notifications as text messages to a supervisory-operated mobile device operated by a supervisor when interactively acquiring approval for a decision on the clock action is needed based on the deciding;
    determining, by the server, to provide the decision as a denial when the supervisory fails to provide the decision within a given time frame to the server; and
    transmitting, by the server, the decision to an employee-operated mobile device of the employee, and also sending the decision to the POS terminal that presents the decision on a display of the POS terminal in response to receiving the decision from the server.

2. The method of claim 1 further comprising, logging, by the server, the clock action, an identifier for the employee, and the decision rendered with respect to the clock action.

3. The method of claim 1, wherein acquiring further includes recognizing the clock action as one of:
    an employee check-in for work, an employee check-out for work, an employee leaving for a break, and an employee returning from the break.

4. The method of claim 2 further comprising, periodically generating, via the server, at least one report based on the logging and a history of other one or more logging events for the employee and one or more other employees.

5. A method for managing a clock action, comprising:
    connecting, by a mobile device, with a Point-Of-Sale (POS) terminal of an enterprise and communicate a clock action of an employee from the mobile device to the POS terminal;
    providing, by the POS terminal, the clock action to a sever;
    receiving, on the mobile device, a notice as to whether the clock action is one of: accepted, denied, and pending for interactive approval by a supervisor;
    wherein receiving further includes interacting in near-real time, by the server, with a different mobile device for the supervisor and obtaining the approval of the clock action through automated text messages provided by the server to the different mobile device operated by the supervisor;
    making, by the server, a decision with respect to the clock action as a denial or the approval based on the interacting;
    determining, by the server the decision to be the denial when the supervisor fails to respond to the text messages within a given time frame;
    providing, by the server, the decision to the POS terminal; and
    presenting, by the POS terminal, on a display of the POS terminal the decision; and
    sending, by the server, the decision to the mobile device operated by the employee.

6. The method of claim 5, wherein connecting further includes identifying the POS terminal as a stand-alone device on site at a facility associated with the enterprise.

7. The method of claim 6, wherein connecting further includes connecting, via the mobile device, the wirelessly.

8. The method of claim 5 further comprising, acquiring, on the mobile device, a custom schedule for one or more projected clock actions of the employee within a configured time interval in the future based on a history of one or more previous clock actions for the employee.

* * * * *